US007732094B2

(12) United States Patent
Pak et al.

(10) Patent No.: US 7,732,094 B2
(45) Date of Patent: Jun. 8, 2010

(54) MESOPOROUS CARBON COMPOSITE, METHOD OF PREPARING THE SAME, AND FUEL CELL USING THE MESOPOROUS CARBON COMPOSITE

(75) Inventors: Chan-ho Pak, Seoul (KR); Yeong-suk Choi, Suwon-si (KR); Hyuk Chang, Seongnam-si (KR); Sang Hoon Joo, Yongin-si (KR)

(73) Assignee: Samsung SDI., Ltd., Suwon-si (KR)

( * ) Notice: Subject to any disclaimer, the term of this patent is extended or adjusted under 35 U.S.C. 154(b) by 436 days.

(21) Appl. No.: 11/443,165

(22) Filed: May 31, 2006

(65) Prior Publication Data
US 2007/0042268 A1 Feb. 22, 2007

(30) Foreign Application Priority Data
Aug. 20, 2005 (KR) .............. 10-2005-0076542

(51) Int. Cl.
  H01M 4/60 (2006.01)
  H01M 4/62 (2006.01)
  H01M 4/88 (2006.01)
  B01J 31/00 (2006.01)
(52) U.S. Cl. ............... 429/213; 429/232; 252/182.1; 502/159; 502/180
(58) Field of Classification Search ............ 429/28, 429/213, 232; 502/180, 185, 416, 418; 252/511; 428/407
See application file for complete search history.

(56) References Cited
U.S. PATENT DOCUMENTS
4,716,087 A * 12/1987 Ito et al. .............. 429/40
4,908,198 A    3/1990 Weinberg
5,057,565 A * 10/1991 Noding et al. .......... 524/109
5,451,476 A *  9/1995 Josefowicz ............. 429/213
5,510,201 A *  4/1996 Werth .................. 429/17

(Continued)

FOREIGN PATENT DOCUMENTS
CN    1520620    8/2004

(Continued)

OTHER PUBLICATIONS
Fuertes, A.B. "Template synthesis of mesoporous carbons with a controlled particle size." Sep. 22, 2003. Journal of Materials Chemistry, 13, 3085-3088.*

(Continued)

Primary Examiner—Dah-Wei D Yuan
Assistant Examiner—Maria J Laios
(74) Attorney, Agent, or Firm—Stein McEwen, LLP (57) ABSTRACT

A mesoporous carbon composite includes mesoporous carbon having mesopores; a conductive polymer coated on only an outer surface of the mesoporous carbon; and an organic electrolyte. The mesoporous carbon composite may be prepared by impregnating an ordered mesoporous silica (OMS) with a mixture comprising a carbon precursor, an acid, and a solvent; heat-treating and carbonizing the impregnated OMS to form an OMS-carbon composite; mixing the OMS-carbon composite with a monomer that forms a conductive polymer and a solvent to provide a surface of the OMS-carbon composite with the monomer; polymerizing the monomer to obtain a conductive polymer-coated OMS-carbon composite; removing the OMS from the composite to obtain a conductive polymer-coated mesoporous carbon; and doping the conductive polymer-coated mesoporous carbon with an organic electrolyte. A supported catalyst and a fuel cell include the mesoporous carbon composite.

15 Claims, 7 Drawing Sheets

U.S. PATENT DOCUMENTS

| | | | |
|---|---|---|---|
| 5,523,177 A * | 6/1996 | Kosek et al. | 429/40 |
| 5,767,036 A * | 6/1998 | Freund et al. | 502/185 |
| 5,843,519 A * | 12/1998 | Tada | 427/115 |
| 6,015,635 A * | 1/2000 | Kawahara | 429/42 |
| 6,040,077 A * | 3/2000 | Debe et al. | 429/40 |
| 6,221,523 B1 * | 4/2001 | Chun et al. | 429/40 |
| 6,297,293 B1 * | 10/2001 | Bell et al. | 521/99 |
| 6,326,098 B1 * | 12/2001 | Itoh et al. | 429/40 |
| 6,380,126 B1 | 4/2002 | Finkelshtain et al. | |
| 6,620,553 B2 * | 9/2003 | Shiga et al. | 429/303 |
| 6,794,480 B2 * | 9/2004 | Goto et al. | 528/125 |
| 7,220,607 B2 | 5/2007 | Danno | |
| 2003/0175579 A1 * | 9/2003 | Uchida et al. | 429/42 |
| 2004/0131934 A1 | 7/2004 | Sugnaux et al. | |
| 2005/0153130 A1 | 7/2005 | Long et al. | |

FOREIGN PATENT DOCUMENTS

| | | |
|---|---|---|
| JP | 62-297207 | 12/1987 |
| JP | 2003-197189 | 7/2003 |
| JP | 2004-71253 | 3/2004 |
| JP | 2005-154268 | 6/2005 |

OTHER PUBLICATIONS

Office Action issued in corresponding Chinese Patent Application No. 200610087647.8 dated Mar. 7, 2008.

Certificate of Patent issued by the Chinese Patent Office in Chinese Patent Application No. 200610087647.8.

Fuertes Antonio B., *Encapsulation of Polypyrrole Chains Inside the Framework of an Ordered Mesoporous Carbon.*, Macromol rapid Commun. Jul. 5, 2005, vol. 26, No. 13, p. 1055-1059.

Nam Jung-Hyun et al., *Direct Methanol Fuel Cell Pt-carbon Catalysts by Using SBA-15 Nanoporous Templates*, Electrochem Commun, NL, Jul. 2004, vol. 6, No. 7, p. 737-741.

Office Action issued by the Japanese Patent Office in Japanese Patent Application No. 2006-152551 on May 26, 2009.

* cited by examiner

MESOPOROUS CARBON COMPOSITE, METHOD OF PREPARING THE SAME, AND FUEL CELL USING THE MESOPOROUS CARBON COMPOSITE

CROSS-REFERENCE TO RELATED APPLICATIONS

This application claims the benefit of Korean Patent Application No. 2005-76542, filed on Aug. 20, 2005, in the Korean Intellectual Property Office, the disclosure of which is incorporated herein in its entirety by reference.

BACKGROUND OF THE INVENTION

1. Field of the Invention

Aspects of the present invention relate to a mesoporous carbon composite, a method of preparing the same and a fuel cell using the carbon composite, and more particularly, to a mesoporous carbon composite that is coated with a conductive polymer to reduce a resistance between carbon particles, thereby reducing electrode resistance, a method of preparing the same, and a fuel cell using the mesoporous carbon composite as a catalyst support.

2. Description of the Related Art

Catalysts contained in electrodes for fuel cells play an important role in facilitating electrochemical reactions, and thus, it is beneficial to increase the activity of these catalysts. Since catalyst activity increases as the reaction surface area of the catalyst increases, catalyst particles should be reduced in diameter to increase the reaction surface area and should be uniformly distributed. To meet these requirements, a catalyst support should also have a large surface area, and thus much research on these requirements has been conducted. Meanwhile, in addition to a large surface area, which may be obtained through high porosity, a fuel cell catalyst support must have sufficient electrical conductivity to act as a path for the flow of electrons. A conventional example of a catalyst support is an amorphous microporous carbon powder, such as activated carbon or carbon black.

However, it is known that micropores of such amorphous microporous carbon particles are poorly connected. Therefore, in a conventional direct methanol fuel cell (DMFC), a supported catalyst that is prepared using an amorphous microporous carbon powder as a support exhibits much lower reactivity than do metal particles used by themselves as a catalyst. However, when metal particles are used as a catalyst, the amount of the catalyst required is greater, and thus, the manufacturing costs of a DMFC increase. Accordingly, the development of a supported catalyst that can improve catalyst activity is urgently required.

SUMMARY OF THE INVENTION

Aspects of the present invention provide a mesoporous carbon composite having a reduced sheet resistance, and a method of preparing the same.

Aspects of the present invention also provide a supported catalyst containing the mesoporous carbon composite and a fuel cell having improved efficiency by using the supported catalyst.

According to an aspect of the present invention, there is provided a mesoporous carbon composite comprising: mesoporous carbon having mesopores; a conductive polymer coated on only an outer surface of the mesoporous carbon; and an organic electrolyte doping the mesoporous carbon and comprising a lithium salt and an organic solvent.

According to another aspect of the present invention, there is provided a method of preparing a mesoporous carbon composite, the method comprising: impregnating a mixture of a carbon precursor, an acid, and a solvent into an ordered mesoporous silica (OMS); heat-treating and carbonizing the impregnated OMS to form an OMS-carbon composite; mixing the OMS-carbon composite with a monomer for forming a conductive polymer and a solvent to provide a surface of the OMS-carbon composite with the monomer for forming a conductive polymer; polymerizing the monomer to form a conductive polymer-coated OMS-carbon composite; removing the OMS from the conductive polymer-coated OMS-carbon composite to obtain a conductive polymer-coated mesoporous carbon; and doping the conductive polymer-coated mesoporous carbon with an organic electrolyte comprising a lithium salt and an organic solvent.

According to another aspect of the present invention, there is provided supported catalyst comprising: the above-described mesoporous carbon composite; and metal catalyst particles that are supported on the mesoporous carbon composite.

According to another aspect of the present invention, there is provided a supported catalyst comprising: a mesoporous carbon composite formed by the above-described method; and metal catalyst particles that are supported on the mesoporous carbon composite.

According to another aspect of the present invention, there is provided a fuel cell comprising: a cathode; an anode; and an electrolyte membrane interposed between the cathode and the anode, wherein at least one of the cathode and the anode contains the above-described supported catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A mesoporous carbon composite according to an embodiment of the present invention is prepared by coating only the outer surface of mesoporous carbon particles with a conductive polymer to reduce a sheet resistance of the mesoporous carbon, thereby reducing a contact resistance between the mesoporous carbon particles. The mesoporous carbon composite is doped with an organic electrolyte comprising a lithium salt and an organic solvent.

According to an aspect of the present invention, the mesoporous carbon may be an ordered mesoporous carbon in which pores are regularly arranged.

As non-limiting examples, the conductive polymer may be at least one polymer selected from the group consisting of polypyrrole, polyaniline, polythiophene and poly(p-phenylene), or a copolymer of monomers of the above-described polymers and a vinylic monomer. As a non-limiting example, the vinylic monomer may be a vinyl monomer described in The Polymer Handbook (Wiley-Interscience; 4th edition 1999).

The amount of the conductive polymer may be 0.5 to 8 parts by weight based on 100 parts by weight of the mesoporous carbon. When the amount of the conductive polymer is less than 0.5 parts by weight, it is not sufficient to provide a conducting line for electrons between the mesoporous carbon particles. When the amount of the conductive polymer is greater than 8 parts by weight, the conductive polymer itself acts as a resistor, and thus can increase the resistance between the mesoporous carbon particles.

While a conventional amorphous microporous carbon powder includes micropores only, the mesoporous carbon according to an embodiment of the present invention includes mesopores as well as micropores in a proper ratio. According to the International Union of Pure and Applied Chemistry (IUPAC), a micropore is defined as a pore of about 2 nm or less in diameter, and a mesopore is defined as a pore of 2 to 50 nm in diameter.

The average diameter of mesopores of the mesoporous carbon composite according to the present embodiment of the present invention is 2 to 10 nm. The mesoporous carbon composite has a specific surface area of 200-2000 $m^2/g$ and a sheet resistance of 30-100 $m\Omega/cm^2$, which is measured using a 4-point probe method at a pressure of $75.4\pm3.0$ $kg_f/cm^2$. The sheet resistance of the mesoporous carbon according to an embodiment of the present invention is much lower than that of conventional mesoporous carbon.

When the average diameter of the mesopores is less than 2 nm, diffusion of a supplied fuel may not smoothly occur and the activity of the catalyst is limited. When the average diameter of the mesopore is greater than 10 nm, catalyst particles easily increase in size when a catalyst is produced, and thus, the efficiency of the catalyst decreases.

When the specific surface area of the mesoporous carbon composite is less than 200 $m^2/g$, it is difficult to improve the dispersion of metal particles to be loaded. When the specific surface area of the mesoporous carbon is greater than 2000 $m^2/g$, diffusion of fuel is limited because of too many micropores, and thus, the efficiency of a catalyst decreases.

Figure 3:
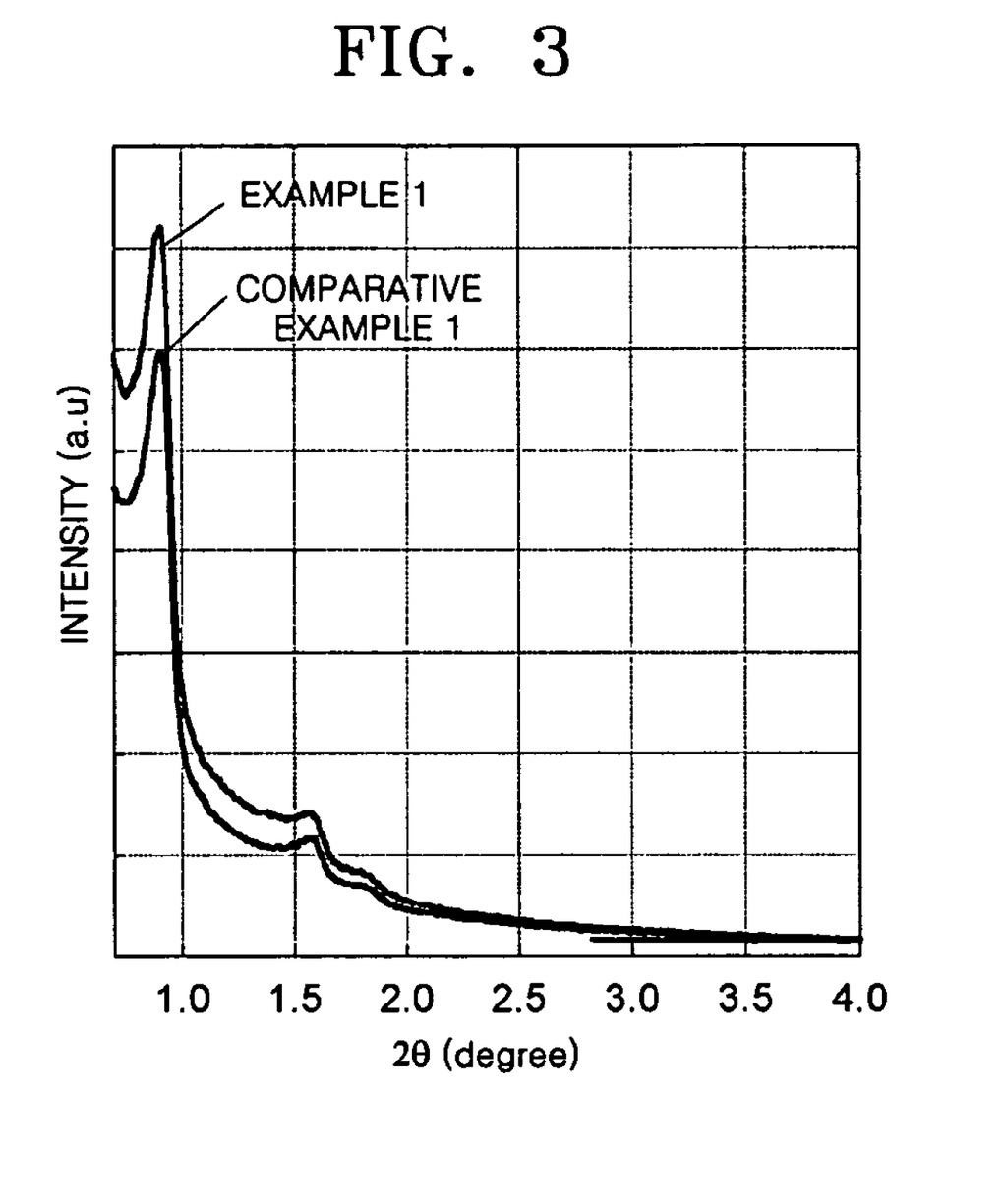
FIG. 3 is a graph illustrating results of X-ray diffraction analysis on a mesoporous carbon composite prepared in Example 1 and a mesoporous carbon prepared in Comparative Example 1.

Since pores in the mesoporous carbon composite of the present embodiment are regularly arranged, a main peak of Bragg angle $2\theta$ for a CuK-$\alpha$ X-ray wavelength of 1.541 Å appears at $1.0\pm0.40$, i.e., between 0.6° and 1.4° as illustrated in FIG. 3. One or more peaks can also be observed at 10° or less.

The mesoporous carbon composite of the present embodiment is doped with an organic electrolyte comprising a lithium salt and an organic solvent. Due to the doping of the organic electrolyte, the sheet resistance of the mesoporous carbon is improved (that is, the sheet resistance is reduced).

The lithium salt may be any lithium salt commonly used in lithium batteries. Specifically, as non-limiting examples, the lithium salt may be at least one selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), and lithium bistrifluoromethanesulfonylamide ($LiN(CF_3SO_2)_2$). The concentration of the lithium salt in the organic electrolyte may be 0.4 to 1.5 M.

As non-limiting examples, the organic solvent may include at least one selected from the group consisting of carbonate compounds, dimethoxyethane (DME), diethoxyethane, and sulfolane (SUL).

Non-limiting examples of the carbonate compounds include ethylene carbonate, methylene carbonate, diethyl carbonate, dimethyl carbonate, $\gamma$-butyrolactone, propylene carbonate, methyl ethyl carbonate, vinylene carbonate, etc.

The amount of the lithium salt may be 0.1 to 10 parts by weight based on 100 parts by weight of the mesoporous carbon. When the amount of the lithium salt is less than 0.1 parts by weight, the conductive polymer is not sufficiently doped. When the amount of the lithium salt is greater than 10 parts by weight, it may be difficult to dissolve the lithium salt in the organic solvent.

The amount of the organic solvent may be 0.1 to 10 parts by weight based on 100 parts by weight of the mesoporous carbon.

Figure 1:
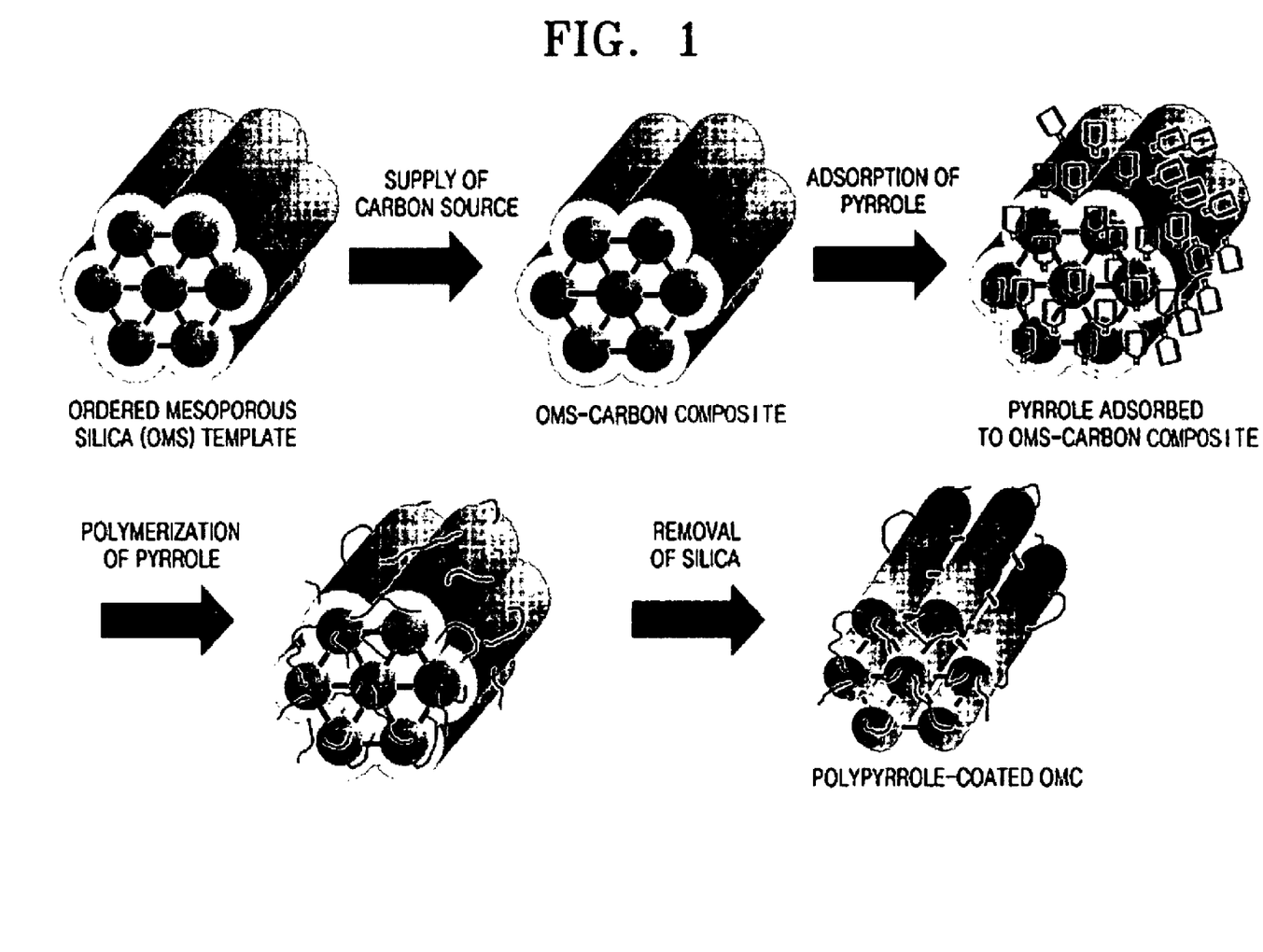
FIG. 1 schematically illustrates a process of forming a mesoporous carbon composite according to an embodiment of the present invention.

FIG. 1 schematically illustrates a process of forming a mesoporous carbon composite according to an embodiment of the present invention. As a non-limiting example, polypyrrole is used as the conductive polymer.

Referring to FIG. 1, carbon is introduced into an ordered mesoporous silica (OMS) template to form an OMS-carbon composite. The OMS has an X-ray diffraction peak of 2 degrees or less due to regularly arranged pores.

Next, pyrrole is adsorbed onto the OMS-carbon composite.

Then, the pyrrole is polymerized to form polypyrrole on the surface of the OMS-carbon composite and the OMS is removed from the resulting structure to obtain a mesoporous carbon composite that is an ordered mesoporous carbon (OMC) coated with polypyrrole.

Figure 2:
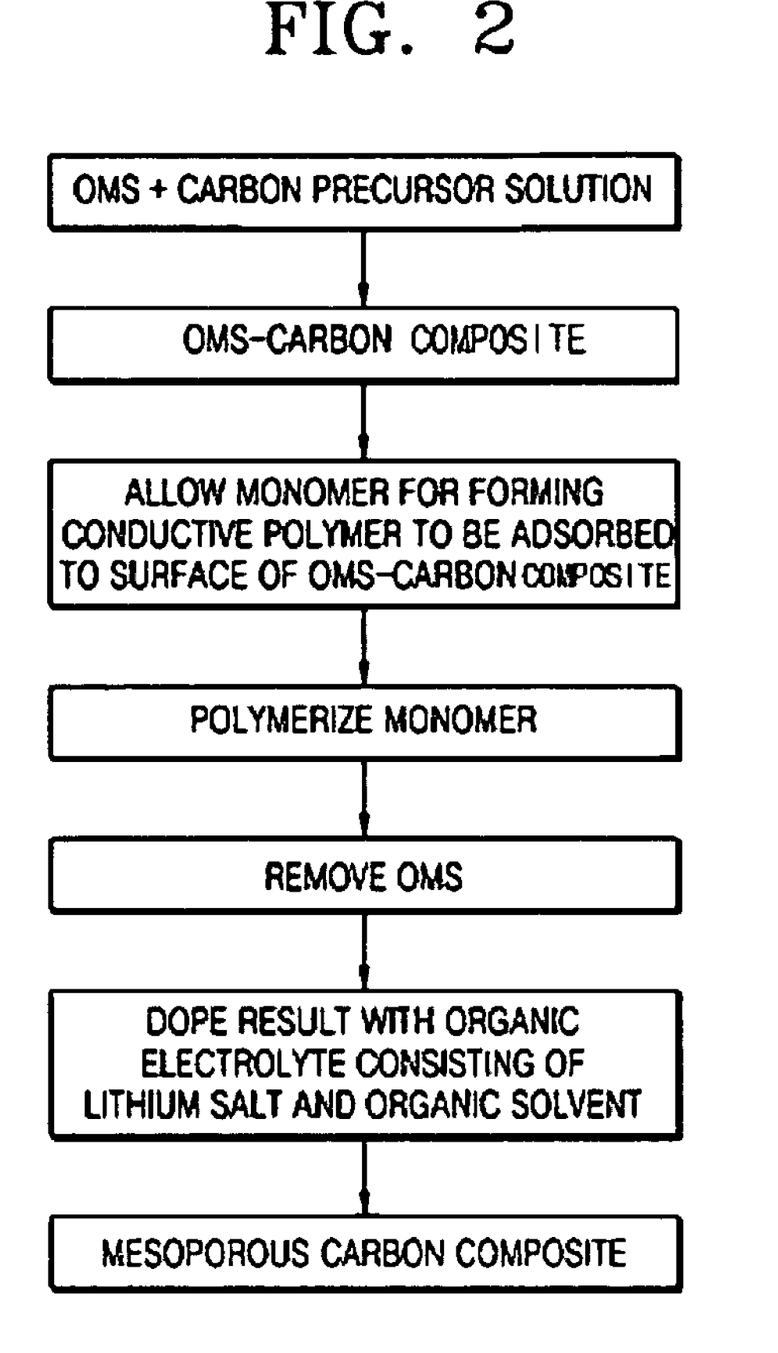
FIG. 2 is a flowchart illustrating a method of preparing a mesoporous carbon composite according to an embodiment of the present invention.

A method of preparing a mesoporous carbon composite according to an embodiment of the present invention will now be described in detail with reference to FIG. 2.

A carbon precursor, an acid, and a solvent are mixed to obtain a carbon precursor mixture.

Non-limiting examples of the carbon precursor include carbohydrates including sucrose, furfuryl alcohol, divinylbenzene, phenol-formaldehyde, resorcinol-formaldehyde, aromatic compounds such as phenanthrene and anthracene. The acid that is used for preparing the precursor mixture may be an organic acid or an inorganic acid. Non-limiting examples of the acid include sulfuric acid, nitric acid, phosphoric acid, and para-toluene sulfuric acid.

The solvent that is used for preparing the precursor mixture may be any solvent that can uniformly disperse the carbon precursor. More particularly, as non-limiting examples, the solvent may be water, acetone, methanol, ethanol, isopropylalcohol, n-propylalcohol, butanol, dimethylacetamide, dimethylformamide, dimethylsulfoxide, N-methyl-2-pyrrolidone, tetrahydrofuran, tetrabutylacetate, n-butylacetate, m-crezole, toluene, ethyleneglycol, γ-butyrolactone, hexafluoroisopropanol (HFIP), or the like. These materials can be used alone or in combination.

The amount of the carbon precursor may be in the range of 5 to 15 parts by weight based on 100 parts by weight of the entire precursor mixture. When the amount of the carbon precursor is less than 5 parts by weight based on 100 parts by weight of the entire precursor mixture, it is difficult to form the mesoporous carbon. When the amount of the carbon precursor is greater than 15 parts by weight based on 100 parts by weight of the entire precursor mixture, it is difficult to dissolve the carbon precursor in the solvent, and particles are likely to be agglomerated such that the surface area of the mesoporous carbon decreases.

The amount of the acid may be in the range of 10 to 35 parts by weight based on 100 parts by weight of the entire precursor mixture. When the amount of the acid is less than 10 parts by weight based on 100 parts by weight of the entire carbon precursor mixture, generation of a mesoporous carbon is not facilitated. When the amount of the acid is greater than 35 parts by weight based on 100 parts by weight of the entire carbon precursor mixture, formation of a carbon material is facilitated even outside the mesoporous silica, and thus, the degree of order is reduced.

The amount of the solvent may be in the range of 55-80 parts by weight based on 100 parts by weight of the entire precursor mixture. When the amount of the solvent is less than 55 parts by weight based on 100 parts by weight of the entire precursor mixture, the precursor is insufficiently dissolved in the solvent. When the amount of the solvent is greater than 80 parts by weight based on 100 parts by weight of the entire precursor mixture, particles are very likely to be agglomerated.

The weight ratio of the carbon precursor to the acid may be in the range of 1:2.5 to 1:3.5, and preferably, 1:2.7 to 1:3.3. When the weight ratio of the carbon precursor to the acid is within this range, the carbon precursor reacts harmoniously with the acid so that the mesoporous carbon may be easily produced.

An ordered mesoporous silica (OMS) is impregnated with the precursor mixture prepared above. Then the impregnated OMS is heat-treated and carbonized to form an OMS-carbon composite.

The mesoporous silica may be a molecular sieve material structured such that one-dimensional pores are mutually connected by micropores. But, the mesoporous silica is not limited thereto. More particularly, as non-limiting examples, the mesoporous silica may be MCM-48, which has a cubic structure, SBA-1, which has a cubic structure different from the cubic structure of MCM-48, SBA-15, which has a hexagonal structure, or KIT-1, MSU-1, which have an irregularly connected three-dimensional connection structure. Furthermore, the mesoporous silica may be any type of molecular sieve material that contains any type of mesoporous material structured such that one-dimensional pores are mutually connected by micropores.

The amount of the mesoporous silica that is impregnated with the precursor mixture may be in the range of 5 to 15 parts by weight based on 100 parts by weight of the precursor mixture. When the amount of the mesoporous silica is less than 5 parts by weight, the relative amount of the precursor mixture is too high. As a result, after impregnation, particles are very likely to become agglomerated so that the surface area of the mesoporous carbon decreases. When the amount of the mesoporous silica is greater than 15 parts by weight, the relative amount of the precursor mixture is too low such that a carbon structure is not sufficiently formed in the silica pore.

The impregnating temperature is not particularly limited, but may be room temperature.

If necessary, the precursor mixture that is impregnated as described above may be dried. The drying temperature is not particularly limited, but may be room temperature. In addition, for quick drying, the drying process may be performed under reduced pressure.

The impregnated OMS may then be heat treated. The heat treatment process may be performed at 50 to 250° C. When the heat treatment temperature is lower than 50° C., the structure of the mesoporous carbon may be formed inappropriately. When the heat treatment temperature is higher than 250° C., the uniformity of the mesoporous carbon to be formed may decrease. Alternatively, the heat treatment process may be divided into a first heat treatment process and a second heat treatment process. For example, the first heat treatment process may be performed at about 50° C. to about 150° C., and the second heat treatment process may be performed at about 150° C. to about 250° C. Through the heat treatment process, a mesoporous carbon structure is formed, and a liquid solvent and the like are completely removed.

The mesoporous carbon may be prepared by impregnating an OMS material, heat-treating the impregnated OMS material and then directly carbonizing the heat-treated impregnated OMS material as described below. However, if the impregnation and heat-treatment is carried out only once, there is a possibility that the carbon structure may be incompletely formed in the mesoporous silica pore. Accordingly, before the impregnated OMS material is carbonized, cycles of impregnating and heat treating may be repeatedly performed to ensure a complete formation of a carbon structure in the mesoporous silica pores. For example, the impregnating and heat treating may be carried out two to ten times. Repetition of the impregnation and heat treatment processes more than 10 times is unnecessary because the attainable effects of the reaction can be obtained with fewer repetitions. As described above, the heat-treated result is carbonized to obtain an ordered mesoporous carbon structure. The carbon precursor that is impregnated into the mesoporous silica acting as a template is graphitized through the carbonization. The carbonization may be achieved by, for example, heating the heat-treated result at 600° C. to 1400° C. When the carbonizing temperature is lower than 600° C., carbonization occurs incompletely and thus, the degree of order may be incomplete. When the carbonizing temperature is higher than 1400° C., carbon may thermally decompose or the structure of the mesoporous silica acting as the template may be deformed.

The carbonization may be performed in a non-oxidation atmosphere. The non-oxidation atmosphere may be selected from a vacuum atmosphere, a nitrogen atmosphere, and an inert gas atmosphere.

Then, the obtained OMS-carbon composite is mixed with a mixture of a monomer that forms a conductive polymer and a solvent to provide the surface of the OMS-carbon composite with the monomer for forming a conductive polymer. Here, the method of providing the monomer is not particularly restricted, but in an embodiment of the present invention, the monomer is adsorbed onto the surface of the OMS-carbon composite.

Non-limiting examples of the monomer that forms a conductive polymer include pyrrole, thiophene, aniline, phenylene, etc. Moreover, a vinylic monomer may be combined with another monomer such that a copolymer is formed. The amount of the monomer may be 0.1 to 10 parts by weight based on 100 parts by weight of the OMS-carbon complex. When the amount of the monomer is less than 0.1 parts by weight, the sheet resistance of the mesoporous carbon is not reduced by a significant amount. When the amount of the monomer is greater than 10 parts by weight, a bulky conductive polymer is formed on the outer surface of the OMS-carbon composite resulting in a reduction of conductivity.

Water may used as the solvent. Further, as non-limiting examples, alcohols such as methanol, ethanol, and propanol, THF, etc., which are very miscible with water, may be used.

The amount of the solvent may be 200 to 1000 parts by weight based on 100 parts by weight of the monomer that forms the conductive polymer. When the amount of the solvent is less than 200 parts by weight, the viscosity increases. When the amount of the solvent is greater than 1000 parts by weight, it is difficult to remove the excess of solvent.

Subsequently, the result is polymerized. In the polymerization process, a polymerization initiator may be used. A polymerization catalyst for facilitating polymerization can also be used.

Non-limiting examples of the polymerization initiator include $H_2O_2$ and $FeCl_3$. The amount of the polymerization initiator may be 0.1 to 100 parts by weight based on 100 parts by weight of the monomer.

Non-limiting examples of the polymerization catalyst include $FeCl_3$ and ammonium sulfate (($NH_4)_2SO_4$). The amount of the polymerization catalyst may be 0.1 to 100 parts by weight based on 100 parts by weight of the monomer.

The polymerization temperature varies depending on the type of the monomer. For example, the polymerization temperature may be 0 to 60° C. When the polymerization temperature is lower than 0° C., polymerization typically cannot occur. When the polymerization temperature is higher than 60° C., it may be difficult to control the polymerization rate.

Then, the mesoporous silica is removed from the conductive polymer-coated OMS-carbon composite using a solvent that can selectively dissolve the mesoporous silica.

The solvent that can selectively dissolve the mesoporous silica may include, for example, an aqueous HF solution or an aqueous NaOH solution. The concentration of the aqueous HF solution may be 5-47 wt % and the concentration of the aqueous NaOH solution may be 5-30 wt %. For example, it known that the mesoporous silica becomes a water-soluble silicate through alkali melting or carbonate dissociation, and reacts with HF to form $SiF_4$, which easily erodes.

When the mesoporous silica is removed, what remains is ordered mesoporous carbon coated on only the outer surface with the conductive polymer.

Then the conductive-polymer coated mesoporous carbon is doped with an organic electrolyte including a lithium salt and an organic solvent to obtain the mesoporous carbon composite according to an embodiment of the present invention. The doping of the organic electrolyte may be carried out at any suitable temperature such as, for example, room temperature (25° C.). The doping time may vary according to the concentration of the organic electrolyte, and typically may be 24 to 72 hours.

A supported catalyst that contains the mesoporous carbon composite acting as a support will now be described in detail.

A supported catalyst according to an embodiment of the present invention includes the mesoporous carbon composite of the present invention, and metal catalyst particles that are distributed and supported on the mesoporous carbon composite. The metal catalyst particles are distributed and supported on the surface or pores of the mesoporous carbon composite.

The metal catalyst that can be used in the supported catalyst according to the current embodiment of the present invention is not particularly limited, but, as non-limiting examples, may be Ti, V, Cr, Mn, Fe, Co, Ni, Cu, Zn, Al, Mo, Se, Sn, Pt, Ru, Pd, W, Ir, Os, Rh, Nb, Ta, Pb, Bi, or a combination of these.

A suitable metal catalyst may vary according to a reaction to which the supported catalyst according to the current embodiment of the present invention is to be subjected. In addition, the metal catalyst may be a single metal or an alloy of two or more metals.

More particularly, when the supported catalyst according to the current embodiment of the present invention is used in a catalyst layer of a cathode or an anode of a fuel cell, such as a phosphoric acid fuel cell (PAFC) or a proton exchange membrane fuel cell (PEMFC), Pt can be used as the metal catalyst. In another embodiment, the supported catalyst may be used in a catalyst layer of an anode of a direct methanol fuel cell (DMFC), in which case, an alloy of Pt and Ru may be used as the metal catalyst. In this case, the atomic ratio of Pt to Ru may be, in general, in the range of about 0.5:1 to about 2:1. In another embodiment, the supported catalyst may be used in a catalyst layer of a cathode of a DMFC, in which case, Pt may be used as the metal catalyst.

When the average particle size of the metal catalyst particles is too small, the catalyst reaction may not be facilitated. On the other hand, when the average particle size of the metal catalyst particles is too large, the reaction surface area of the entire catalyst particle is reduced and thus, the efficiency of the supported catalyst may be reduced. In consideration of these problems, the average particle diameter of the metal catalyst particles may be in the range of about 1 nm to about 5 nm.

When the amount of the metal catalyst particles contained in the supported catalyst is too small, the metal catalyst may have little effect when applied to a fuel cell. When the amount of the metal catalyst particles contained in the supported catalyst is too large, the manufacturing costs may increase and the catalyst particle size may increase. In consideration of these problems described above, the amount of the metal catalyst contained in the supported catalyst may be in the range of 40 to about 80 parts by weight based on 100 parts by weight of the supported catalyst.

The supported catalyst according to the current embodiment of the present invention can be formed using various known methods of producing a supported catalyst. For example, the supported catalyst according to the current embodiment of the present invention may be formed by impregnating a support with a metal catalyst precursor solution and reducing the impregnated metal catalyst precursor. The method of producing a supported catalyst is described in various references in detail and thus will not be described here in detail.

A fuel cell according to an embodiment of the present invention will now be described in detail.

The fuel cell according to the current embodiment of the present invention includes a cathode, an anode, and an electrolyte membrane interposed therebetween. At least one of the cathode and the anode may include the supported catalyst described above.

The fuel cell according to the current embodiment of the present invention may be, for example, a PAFC, a PEMFC, or a DMFC. The structures of these fuel cells and methods of manufacturing them are not particularly limited and are described in detail in various references. Accordingly, the structure and manufacturing method of the fuel cell of the present embodiment will not be described here in detail.

The present invention will be described in further detail with reference to the following examples. These examples are for illustrative purposes only and are not intended to limit the scope of the present invention.

Example 1

Preparation of Mesoporous Carbon Composite 0.8 g of phenanthrene and 2.4 g of para-toluene sulfuric acid were completely dissolved in 6 mL of acetone to prepare a homogeneous precursor mixture. The precursor mixture was divided into three parts in a weight ratio of 4:3:2, to thus prepare solution A, B, and C, respectively. 1 g of SBA-15, an OMS material, was impregnated with solution A. The impregnated SBA-15 was dried in a hood at room temperature for 30 minutes, and then dried at 160° C. for 2 hours. The dried result was impregnated with solution B, and then was dried as described above. The result was treated in the same manner as described above except that the solution C was used. The dried result was cooled to room temperature, slowly heated to 200° C. for 1 hour, and maintained for 6 hours. Then, the result was slowly heated to 900° C. for 4 hours and maintained for 2 hours to form an OMS-carbon composite.

Figure 5:
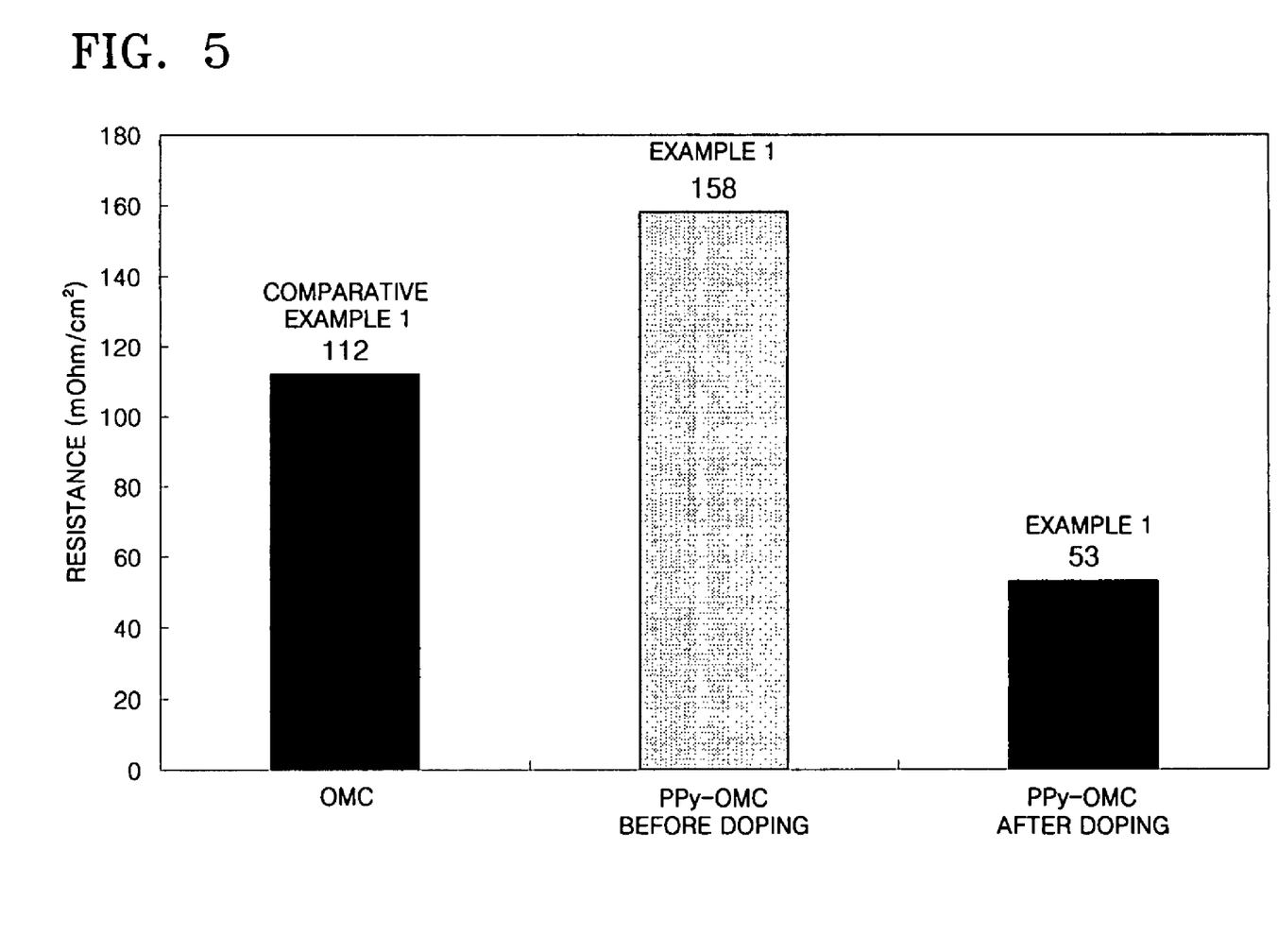
FIG. 5 illustrates measurement results of the sheet resistance of the mesoporous carbon composite prepared in Example 1 and the mesoporous carbon prepared in Comparative Example 1.

The OMS-carbon composite was immersed in 50 ml of a 1M pyrrole aqueous solution for 1 hour to allow pyrrole to be absorbed onto the OMS-carbon composite. The pyrrole-adsorbed OMS-carbon composite was obtained though filtering and placed in a 30 wt % $H_2O_2$ aqueous solution for 1 hour to form polypyrrole. The result was stirred with a mixed solution containing HF, water, and ethanol to remove the SBA-15, thereby obtaining a mesoporous carbon composite coated with polypyrrole. The sheet resistance of the mesoporous carbon composite was measured in this state, that is before a doping process was performed, and the result is shown in FIG. 5.

To provide the polypyrrole with electric conductivity, the mesoporous carbon composite was placed in a doping solution of 5 wt % lithium perchlorate ($LiClO_4$) in ethylene carbonate and propylene carbonate at a volume ratio of 1:1 and mixed at room temperature for 48 hours. The polypyrrole-coated mesoporous carbon was filtered, washed, and dried in a vacuum oven at 60° C. to obtain a doped mesoporous carbon composite. The sheet resistance of the doped mesoporous carbon composite was measured after doping, and the result is also shown in FIG. 5.

Comparative Example 1

0.8 g of phenanthrene and 2.4 g of para-toluene sulfuric acid were completely dissolved in 6 mL of acetone to prepare a homogeneous precursor mixture. The precursor mixture was divided into three parts in a weight ratio of 4:3:2 to thus prepare solution A, B, and C, respectively. 1 g of SBA-15 was impregnated with the solution A. The impregnated SBA-15 was dried in a hood at room temperature for 30 minutes, and then dried at 160° C. for 2 hours.

The dried result was impregnated with the solution B, and then was dried as described above. The result was treated in the same manner as described above except that the solution C was used.

The dried result was cooled to room temperature, slowly heated to 200° C. for 1 hour, and maintained for 6 hours. Then the result was slowly heated to 900° C. for 4 hours and maintained for 2 hours to form an OMS-carbon complex.

The result was stirred with a mixed solution containing HF, water, and ethanol to remove the SBA-15, thereby obtaining an uncoated mesoporous carbon.

FIG. 3 illustrates the results of the X-ray diffraction analysis on the mesoporous carbon composite prepared in Example 1 and the mesoporous carbon prepared in Comparative Example 1.

Referring to FIG. 3, pores of the mesoporous carbon composite prepared in Example 1 are regularly arranged and the second and third peaks are observed, indicating that the mesoporous carbon composite is well ordered. In addition, the mesoporous carbon composite prepared in Example 1 exhibits similar structural uniformity to the mesoporous carbon prepared in Comparative Example 1, indicating that the mesoporous carbon composite was not structurally changed even though it was coated with polypyrrole.

Figure 4:
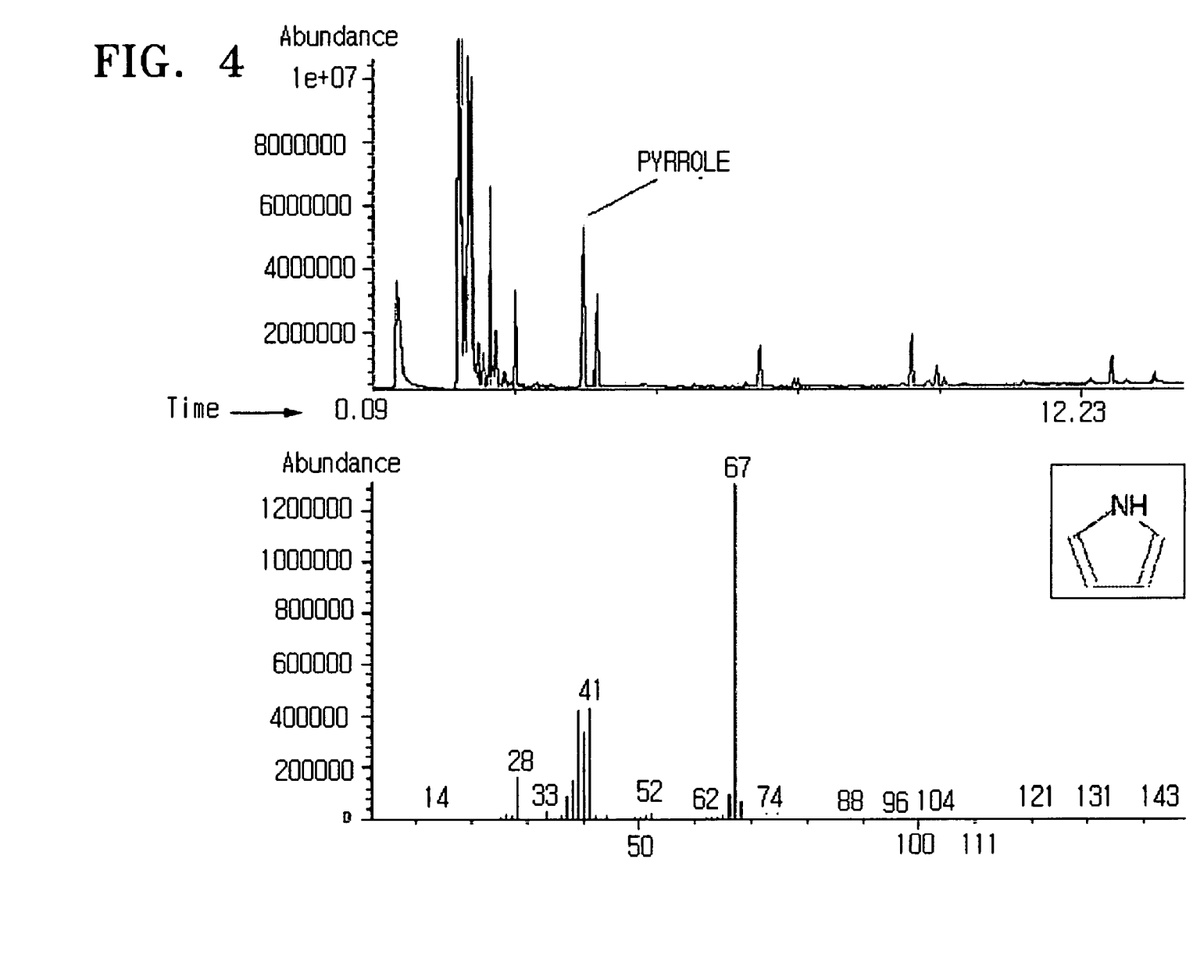
FIG. 4 illustrates a result of gas chromatography/mass spectrometry (GC/MS) analysis on the mesoporous carbon composite prepared in Example 1.

FIG. 4 illustrates the results of GC-MS analysis on the mesoporous carbon composite prepared in Example 1.

Referring to FIG. 4, it can be seen from a peak observed at about 4 minutes that the mesoporous carbon composite prepared in Example 1 contained pyrrole.

FIG. 5 illustrates measurement results of the sheet resistance of the mesoporous carbon composite prepared in Example 1 and the mesoporous carbon prepared in Comparative Example 1. The sheet resistance was measured as follows.

The sheet resistance was measured using a 4-point probe method. 50 mg of the mesoporous carbon composite of Example 1 was placed in a sheet resistance measurement system (CMT series, Changmintech) and the sheet resistance was measured while applying pressures of 75.4 $kg/cm^2$ thereto. The sheet resistance measurement system included 4 electrodes, i.e., a pair of electrodes for measuring a voltage and a pair of electrodes for measuring a current at a bottom of a chamber containing a material to be measured.

Referring to FIG. 5, the mesoporous carbon composite of Example 1 is shown to have a much lower sheet resistance than the mesoporous carbon of Comparative Example 1.

Figure 6:
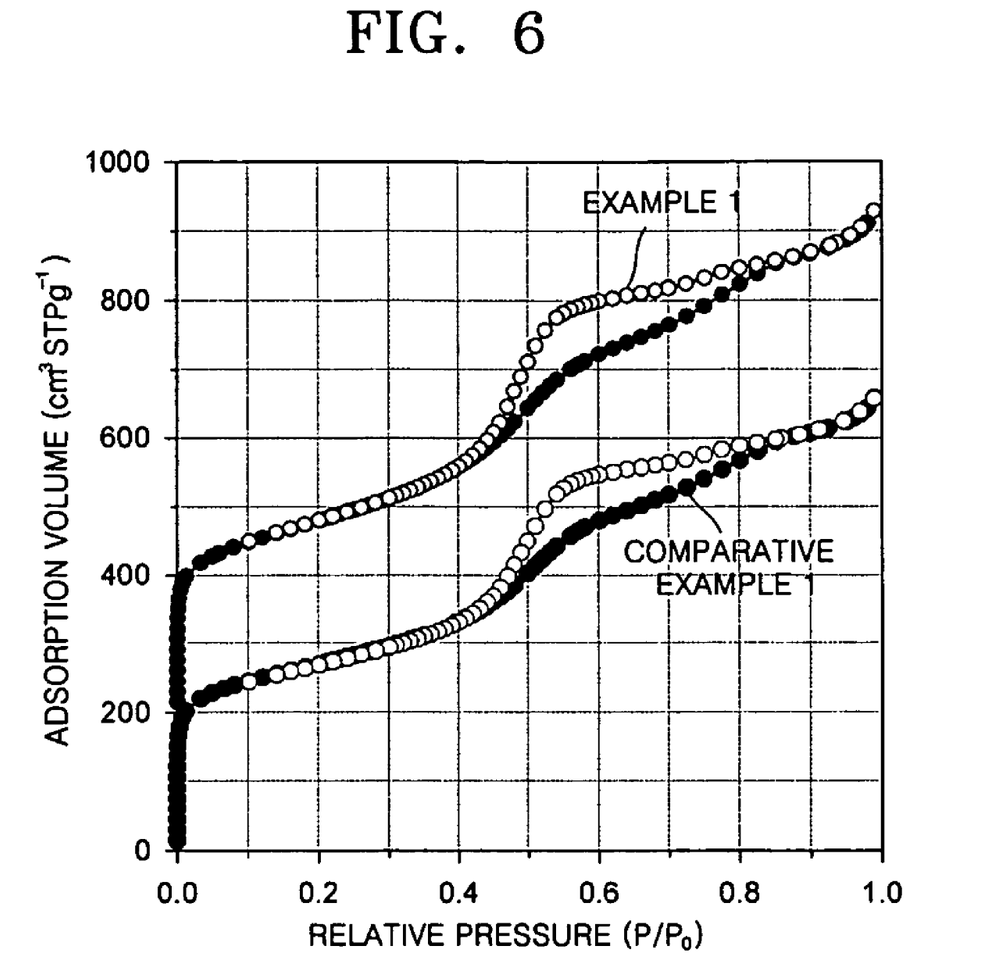
FIG. 6 is a graph illustrating nitrogen adsorption-desorption isotherms for analyzing BET surface areas of the mesoporous carbon composite prepared in Example 1 and the mesoporous carbon prepared in Comparative Example 1.

FIG. 6 is a graph illustrating nitrogen adsorption-desorption curves of the mesoporous carbon composite prepared in Example 1 and the mesoporous carbon prepared in Comparative Example 1.

Figure 7:
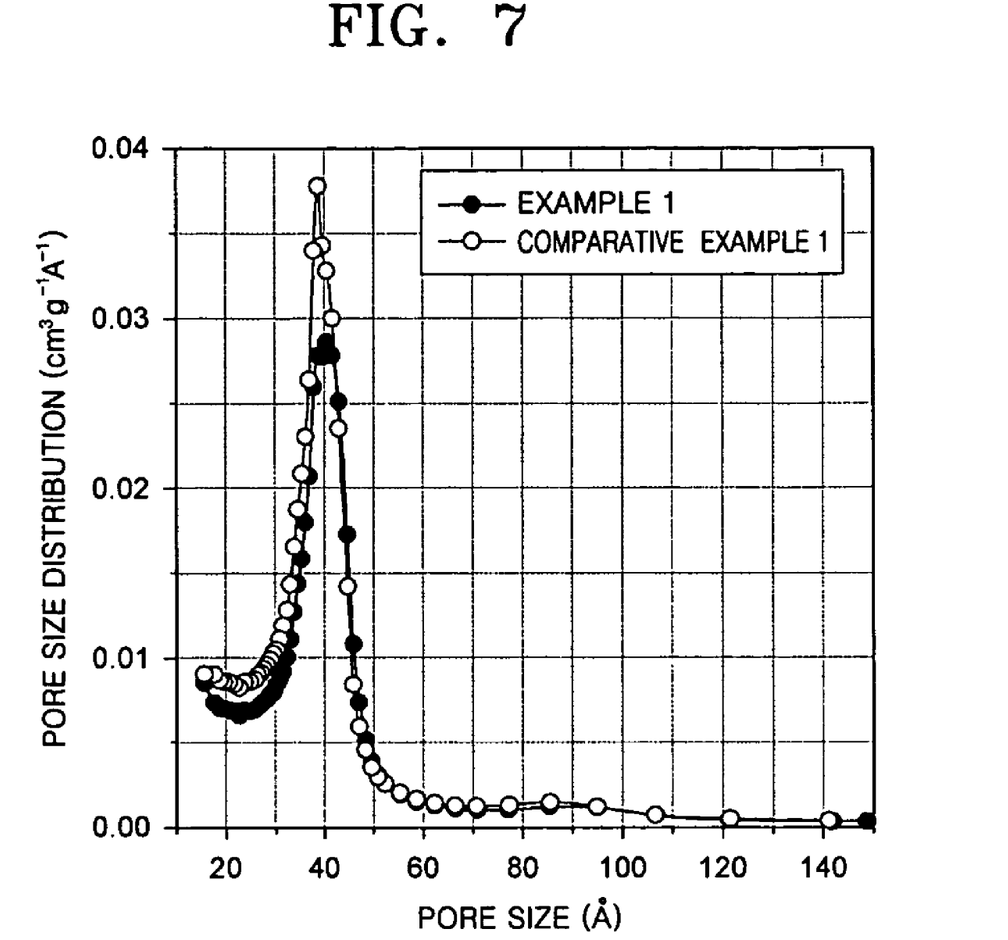
FIG. 7 is a graph illustrating a pore size distribution of the mesoporous carbon composite prepared in Example 1 and the mesoporous carbon prepared in Comparative Example 1.

The pore size distributions of the mesoporous carbon composite prepared in Example 1 and the mesoporous carbon prepared in Comparative Example 1 were calculated from the nitrogen adsorption-desorption curves illustrated in FIG. 6 and the results are illustrated in FIG. 7.

Referring to FIG. 6, the mesoporous carbon composite of Example 1 has a similar nitrogen adsorption-desorption curve to the mesoporous carbon prepared in Comparative Example 1. This is because the conductive polymer is coated only on the outer surface of the mesoporous carbon particles.

The surface area, the pore volume and the pore diameter of the mesoporous carbon composite of Example 1 and the mesoporous carbon of Comparative Example 1 are shown in Table 1.

TABLE 1

|  | Surface area ($m^2/g$) | Pore volume ($cm^3/g$) | Pore diameter (nm) |
| --- | --- | --- | --- |
| Example 1 | 934 | 1.08 | 3.9 |
| Comparative Example 1 | 872 | 0.98 | 4.0 |

It can be seen from Table 1 that samples prepared in Example 1 and Comparative Example 1 have large surface areas and similar mesoporous pore volumes. Thus, the mesoporous carbon samples having these physical properties can be used as support for catalysts of fuel cells or as electrode materials themselves.

Example 2

Manufacture of Supported Catalyst And Fuel Cell 0.5 g of the mesoporous carbon prepared in Example 1 was placed in a vinyl bag, and 0.9616 g of $H_2PtCl_6$ was dissolved in 1.5 ml of acetone. The $H_2PtCl_6$ solution was added to the vinyl bag containing the mesoporous carbon.

The mixed solution was dried in air for four hours, transferred to a crucible, and then dried in a drying device at 60° C. overnight. Then the crucible was placed in an electric furnace through which nitrogen was passed for 10 minutes. Then, hydrogen was passed through while the temperature was increased from room temperature to 200° C. and then maintained at 200° C. for 2 hours so that the Pt salt impregnated in the mesoporous carbon was reduced. Then, the gas flowing in the electric furnace was replaced with nitrogen. The temperature was increased by 5° C./min to 250° C., maintained for 5 hours, and then slowly cooled to room temperature. Then, the result was impregnated with 0.9616 g of $H_2PtCl_6$ dissolved in 1.5 ml of acetone, and the reduction process was repeated. As a result, a supported catalyst in which the concentration of impregnated Pt was 60% by weight was obtained.

The supported catalyst was dispersed in a solution prepared by dispersing NAFION 115 (DuPont Inc.) in isopropyl alcohol, to form slurry. The slurry was coated onto a carbon electrode using a spraying process, and the concentration of the coated catalyst was 3 mg/cm² based on the amount of Pt. Then, the electrode was passed through a rolling machine to increase the adhesive force between a catalyst layer and a carbon paper, thus forming a cathode.

An anode electrode was produced using a commonly available PtRu black catalyst. Then, a unit cell was produced using the cathode and the anode.

Comparative Example 2

Manufacture of Supported Catalyst And Fuel Cell

A unit cell was produced using the supported catalyst prepared according to Comparative Example 1 in the same manner as in Example 2.

Performances of the unit cells were measured at 50° C. while 2M methanol and an excessive amount of air were supplied.

The fuel cell prepared in Example 2 exhibited higher efficiency than the fuel cell prepared in Comparative Example 2.

The mesoporous carbon composite according to an aspect of the present invention is coated only on the outer surface of mesoporous carbon with a conductive polymer to reduce sheet resistance of the mesoporous carbon composite, and thus can efficiently transfer electric energy. Such a mesoporous carbon composite can be used as a conductive material for electrodes for fuel cells. The mesoporous carbon composite may be used as a support for electrode catalysts, and a supported catalyst containing the support can be used to manufacture a fuel cell having improved efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A mesoporous carbon composite comprising:
   mesoporous carbon having mesopores;
   an electrically conductive polymer coated on only an outer surface of the mesoporous carbon; and
   an organic electrolyte doping the electrically conductive polymer-coated mesoporous carbon and comprising a lithium salt and an organic solvent,
   wherein the mesoporous carbon composite has a main peak at a Bragg angle 2θ for a CuK-α X-ray wavelength of 1.541 Å at 1.0±0.4 degrees, and one or more peaks appear within 10 degrees.

2. The mesoporous carbon composite of claim 1, wherein the electrically conductive polymer is at least one polymer selected from the group of polymers consisting of polypyrrole, polyaniline, polythiophene and poly(p-phenylene), or a copolymer of monomers of the above-described polymers and a vinylic monomer.

3. The mesoporous carbon composite of claim 1, wherein the electrically conductive polymer is at least one polymer selected from the group of polymers consisting of polypyrrole, polyaniline, polythiophene.

4. The mesoporous carbon composite of claim 1, wherein the amount of the electrically conductive polymer is 0.5 to 8 parts by weight based on 100 parts by weight of the mesoporous carbon.

5. The mesoporous carbon composite of claim 1, wherein the average diameter of a mesopore of the mesoporous carbon is 2 to 10 nm, and the mesoporous carbon composite has a specific surface area of 200 to 2000 m²/g and a sheet resistance of 30 to 100 mΩ/cm² at a pressure of 75.4 kg$_f$/cm².

6. The mesoporous carbon composition of claim 1, wherein the lithium salt is lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), or lithium bistrifluoromethanesulfonylamide ($LiN(CF_3SO_2)_2$).

7. The mesoporous carbon composite of claim 1, wherein the amount of the lithium salt is 0.1 to 10 parts by weight based on 100 parts by weight of the mesoporous carbon and the amount of the organic solvent is 0.01 to 10 parts by weight based on 100 parts by weight of the mesoporous carbon.

8. A mesoporous carbon composite formed by a method comprising:
   impregnating an ordered mesoporous silica (OMS) with a carbon precursor mixture comprising a carbon precursor, an acid, and a solvent;
   heat-treating and carbonizing the impregnated OMS to form an OMS-carbon composite;
   mixing the OMS-carbon composite with a monomer that forms an electrically conductive polymer and a solvent to provide a surface of the OMS-carbon composite with the monomer that forms an electrically conductive polymer;
   polymerizing the monomer to obtain an electrically conductive polymer-coated OMS-carbon composite;

removing the OMS from the electrically conductive polymer-coated OMS-carbon composite to obtain an electrically conductive polymer-coated on only an outer surface of the mesoporous carbon having ordered mesopores; and
doping the electrically conductive polymer-coated mesoporous carbon with an organic electrolyte comprising a lithium salt and an organic solvent to form the mesoporous carbon composite
wherein the mesoporous carbon composite has a main peak at a Bragg angle $2\theta$ for a CuK-$\alpha$ X-ray wavelength of 1.54 Å at $1.0\pm0.4$ degrees, and one or more peaks appear within 10 degrees.

9. A supported catalyst comprising:
the mesoporous carbon composite of claim 1; and
metal catalyst particles that are supported on the mesoporous carbon composite.

10. The supported catalyst of claim 9, wherein the amount of the metal catalyst particles is 40 to 80 parts by weight based on 100 parts by weight of the supported catalyst.

11. A supported catalyst comprising:
the mesoporous carbon composite of claim 8; and
metal catalyst particles that are supported on the mesoporous carbon composite.

12. A fuel cell comprising:
a cathode;
an anode; and
an electrolyte or electrolyte membrane interposed between the cathode and the anode, wherein at least one of the cathode and the anode contains the supported catalyst of claim 9.

13. The fuel cell of claim 12, wherein the fuel cell is a phosphoric acid fuel cell.

14. The fuel cell of claim 12, wherein the fuel cell is a proton exchange membrane fuel cell.

15. The fuel cell of claim 12, wherein the fuel cell is a direct methanol fuel cell.

\* \* \* \* \*

UNITED STATES PATENT AND TRADEMARK OFFICE
CERTIFICATE OF CORRECTION

| | | |
|---|---|---|
| PATENT NO. | : 7,732,094 B2 | Page 1 of 1 |
| APPLICATION NO. | : 11/443165 | |
| DATED | : June 8, 2010 | |
| INVENTOR(S) | : Pak et al. | |

It is certified that error appears in the above-identified patent and that said Letters Patent is hereby corrected as shown below:

On the title page item (73),
Change "SDI.," to --SDI Co.,--.

Col. 4, line 4,
Change "1.0±0.40,"
to --1.0±0.4°,--.

Col. 5, line 6,
Change "m-crezole,"
to --m-cresol,--.

Signed and Sealed this
Fourth Day of January, 2011

David J. Kappos
*Director of the United States Patent and Trademark Office*